(12) United States Patent
Chen et al.

(10) Patent No.: US 6,549,372 B1
(45) Date of Patent: Apr. 15, 2003

(54) DEVICE FOR LIMITING HEAD MOVEMENT WITHIN A HARD DISK DRIVE

(75) Inventors: Shiao-Hua Chen, Palo Alto, CA (US); Youn Tai Kim, Kyung-ki (KR); Wei Min Wang, Palo Alto, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 09/211,841

(22) Filed: Dec. 15, 1998

(51) Int. Cl.$^7$ .............................................. G11B 17/32
(52) U.S. Cl. ................................................... 360/234.5
(58) Field of Search ................................. 360/104–106, 360/234.5, 244.2, 245.8, 245.7, 245.6, 245.5

(56) References Cited

U.S. PATENT DOCUMENTS

| | | | |
|---|---|---|---|
| 3,558,831 A | 1/1971 | Prescott et al. | |
| 4,110,802 A | 8/1978 | Ho et al. | |
| 4,280,156 A | 7/1981 | Villette | |
| 4,493,554 A | 1/1985 | Pryor et al. | |
| 4,555,739 A | 11/1985 | Le Van et al. | |
| 4,562,500 A | 12/1985 | Bygdnes | |
| 4,630,926 A | 12/1986 | Tanaka et al. | |
| 4,661,873 A | 4/1987 | Schulze | |
| 4,673,996 A | 6/1987 | White | |
| 4,703,376 A | 10/1987 | Edwards et al. | |
| 4,731,777 A | 3/1988 | Yoshitoshi et al. | |
| 4,739,425 A | 4/1988 | Dierkes et al. | |
| 4,784,012 A | 11/1988 | Marra | |
| 4,794,588 A | 12/1988 | Yoshitoshi et al. | |
| 4,802,042 A | 1/1989 | Strom | |
| 4,819,105 A | 4/1989 | Edwards | |
| 4,839,756 A | 6/1989 | Chew et al. | |
| 4,866,553 A | 9/1989 | Kubo et al. | |
| 4,870,519 A | 9/1989 | White | |
| 4,890,172 A | 12/1989 | Watt et al. | |
| 4,949,206 A | 8/1990 | Phillips et al. | |
| 4,958,337 A | 9/1990 | Yamanaka et al. | |
| 4,982,300 A | 1/1991 | Forbord | |
| 5,004,207 A | 4/1991 | Ishikawa et al. | |
| 5,021,905 A | 6/1991 | Sleger | |
| 5,029,026 A | 7/1991 | Stefansky et al. | |
| 5,062,017 A | 10/1991 | Strom et al. | |
| 5,097,370 A | 3/1992 | Hsia | |
| 5,128,822 A | 7/1992 | Chapin et al. | |
| 5,130,870 A | 7/1992 | Jabbari | |
| 5,159,508 A | 10/1992 | Grill et al. | |
| 5,161,900 A | 11/1992 | Bougathou et al. | |
| 5,167,167 A | 12/1992 | Tiernan, Jr. et al. | |
| 5,175,661 A | 12/1992 | Mizuno et al. | |
| 5,187,621 A | 2/1993 | Tacklind | |
| 5,200,868 A | 4/1993 | Chapin et al. | |
| 5,202,803 A | 4/1993 | Albrecht et al. | |
| 5,214,549 A | 5/1993 | Baker et al. | |
| 5,241,438 A | 8/1993 | Matsushima | |
| 5,243,495 A | 9/1993 | Read et al. | |
| 5,247,493 A | 9/1993 | Kime et al. | |
| 5,262,911 A | 11/1993 | Cain et al. | |

(List continued on next page.)

FOREIGN PATENT DOCUMENTS

| | | |
|---|---|---|
| EP | 0 426 353 A2 | 5/1991 |
| EP | 0 463 752 A2 | 1/1992 |
| EP | 0 491 563 A2 | 6/1992 |

(List continued on next page.)

OTHER PUBLICATIONS

US 6,091,569, 7/2000, Allsup et al. (withdrawn)

*Primary Examiner*—Allen Cao
(74) *Attorney, Agent, or Firm*—Irell & Manella, LLP; Jeffrey P. Aiello

(57) ABSTRACT

A hard disk drive assembly which includes a limiter plate that is attached to an actuator arm. The limiter plate limits a movement of a flexure arm that is attached to a head. The head is coupled to a disk. The limiter plate limits the distance that the head can move away from the disk. Limiting the movement of the head may reduce the impact force associated with the head slapping the disk.

20 Claims, 2 Drawing Sheets

U.S. PATENT DOCUMENTS

| | | | |
|---|---|---|---|
| 5,262,913 A | 11/1993 | Stram et al. | |
| 5,267,109 A | 11/1993 | Chapin et al. | |
| 5,274,519 A | 12/1993 | Saito et al. | |
| 5,287,235 A | 2/1994 | Cunningham et al. | |
| 5,293,282 A | 3/1994 | Squires et al. | |
| 5,309,303 A | 5/1994 | Hsia et al. | |
| 5,319,511 A | 6/1994 | Lin | |
| 5,343,343 A | 8/1994 | Chapin | |
| 5,347,414 A | 9/1994 | Kano | |
| 5,365,389 A | 11/1994 | Jabbari et al. | |
| 5,369,538 A | 11/1994 | Moe et al. | |
| 5,396,386 A | 3/1995 | Bolasna et al. | |
| 5,396,387 A | 3/1995 | Murray | |
| 5,402,290 A | 3/1995 | Daniel | |
| 5,404,256 A | 4/1995 | White | |
| 5,410,402 A | 4/1995 | Li et al. | |
| 5,422,776 A | 6/1995 | Thorson et al. | |
| 5,426,562 A | 6/1995 | Morehouse et al. | |
| 5,442,638 A | 8/1995 | Awad et al. | |
| 5,455,728 A | 10/1995 | Edwards et al. | |
| 5,460,017 A | 10/1995 | Taylor | |
| 5,463,527 A | 10/1995 | Hager et al. | |
| 5,469,311 A | 11/1995 | Nishida et al. | |
| 5,537,272 A | 7/1996 | Kazmierczak et al. | |
| 5,546,250 A | 8/1996 | Diel | |
| 5,555,144 A | 9/1996 | Wood et al. | |
| 5,570,249 A * | 10/1996 | Aoyagi et al. | 360/106 |
| 5,610,776 A | 3/1997 | Oh | |
| 5,636,090 A | 6/1997 | Boigenzahn et al. | |
| 5,657,300 A * | 8/1997 | Takahashi | |
| 5,663,853 A | 9/1997 | Park | |
| 5,673,158 A | 9/1997 | Ichimura | |
| 5,677,813 A | 10/1997 | Yoshida et al. | |
| 5,703,734 A | 12/1997 | Berberich et al. | |
| 5,754,353 A | 5/1998 | Behrens et al. | |
| 5,768,249 A | 6/1998 | Ro et al. | |
| 5,781,373 A | 7/1998 | Larson et al. | |
| 5,801,899 A | 9/1998 | Genheimer | |
| 5,815,349 A * | 9/1998 | Frater | 360/104 |
| 5,822,139 A | 10/1998 | Ayabe | |
| 5,831,795 A | 11/1998 | Ma et al. | |
| 5,844,754 A | 12/1998 | Stefansky et al. | |
| 5,844,911 A | 12/1998 | Schadegg et al. | |
| 5,875,067 A | 2/1999 | Morris et al. | |
| 5,885,005 A | 3/1999 | Nakano et al. | |
| 5,886,851 A | 3/1999 | Yamazaki et al. | |
| 5,901,017 A | 5/1999 | Sano et al. | |
| 5,926,347 A | 7/1999 | Kouhei et al. | |
| 5,930,079 A * | 7/1999 | Vera et al. | 360/104 |
| 5,930,080 A * | 7/1999 | Frater et al. | 360/104 |
| 5,936,927 A | 8/1999 | Soga et al. | |
| 5,969,901 A | 10/1999 | Eckberg et al. | |
| 5,987,733 A * | 11/1999 | Goss | 360/245.7 |
| 6,011,670 A | 1/2000 | Balsley, Jr. et al. | |
| 6,034,941 A | 3/2000 | Ro | |
| 6,046,883 A * | 4/2000 | Miller | 360/245.7 |
| 6,084,744 A | 7/2000 | Genheimer et al. | |
| 6,088,192 A | 7/2000 | Riener et al. | |
| 6,088,194 A | 7/2000 | Imaino et al. | |
| 6,088,202 A * | 7/2000 | Kabasawa et al. | 360/245.7 |
| 6,154,360 A | 11/2000 | Kaczeus, Sr. et al. | |
| 6,157,522 A | 12/2000 | Murphy et al. | |
| 6,166,901 A | 12/2000 | Gamble et al. | |
| 6,185,075 B1 | 2/2001 | Tsujino et al. | |
| 6,185,807 B1 | 2/2001 | Kazmierczak et al. | |
| 6,198,606 B1 | 3/2001 | Boutaghou et al. | |
| 6,201,668 B1 | 3/2001 | Murphy | |
| 6,205,005 B1 | 3/2001 | Heath | |
| 6,226,143 B1 | 5/2001 | Stefansky | |
| 6,226,152 B1 | 5/2001 | Tanaka et al. | |
| 6,229,668 B1 | 5/2001 | Huynh et al. | |
| 6,233,124 B1 | 5/2001 | Budde et al. | |
| 6,239,943 B1 | 5/2001 | Jennings et al. | |

FOREIGN PATENT DOCUMENTS

| | | | |
|---|---|---|---|
| EP | 0 582 464 A2 | 2/1994 | |
| EP | 0 801 387 A2 | 10/1997 | |
| FR | 2518791 * | 6/1983 | 360/106 |
| GB | 2 050 670 A | 1/1981 | |
| GB | 2 100052 A | 12/1982 | |
| GB | 2 326 755 A | 12/1998 | |
| JP | 632 344 55 | 9/1988 | |
| JP | 3-83281 | 4/1991 | |
| JP | 3-104079 | 5/1991 | |
| JP | 09251769 A | 9/1997 | |
| JP | 9-293370 | 11/1997 | |
| WO | WO 93/10494 | 5/1993 | |
| WO | WO 96/34390 | 10/1996 | |

\* cited by examiner

DEVICE FOR LIMITING HEAD MOVEMENT WITHIN A HARD DISK DRIVE

BACKGROUND OF THE INVENTION

1. Field of the Invention

The present invention relates to an element which limits a movement of a head within a hard disk drive assembly.

2. Background Information

Hard disk drives contain transducers that are magnetically coupled to one or more rotating disks. The transducers can write and read information by magnetizing the disk surface and sensing the magnetic field that flows from the disks, respectively. The transducers are integrated into a head that is mounted to a flexure arm. The head and flexure arm are typically referred to as a head gimbal assembly (HGA).

The HGA's of a hard disk drive are mounted to an actuator arm that is pivotally connected to a base plate of the drive. The drive may further include a voice coil motor that rotates the actuator arm and moves the heads across the surfaces of the disks.

The disk drive may have a number of disks that are stacked onto a spin motor. There may be an HGA associated with each disk surface. The HGAs may be attached to the actuator arm so that rotation of the arm causes a corresponding movement in all of the heads. The actuator arm may have a plurality of beams that each support a pair of HGAs. Some disk drives are manufactured without a head coupled to every disk surface of the drive. To maintain the mechanical characteristics of the actuator arm assembly, "dummy" non-active HGAs are typically attached to the actuator arm beams in lieu of the missing heads.

Each head has an air bearing surface which cooperates with an air flow generated by the rotating disks to create an air bearing between the head and the disk surfaces. The air bearing prevents mechanical wear between the disks and the heads.

The heads are essentially suspended from the actuator arm above or below the surfaces of the disks. Any shock or vibration loads essentially perpendicular to the disk surfaces may cause the heads to strike or "slap" the disks. Head slapping may damage both the heads and the disk.

Head slapping typically occurs when the shock load is great enough to cause the head to "separate" away from the disk surface. The beams of the top and bottom actuator arm assemblies are typically thinner than other actuator arms since only one HGA is mounted to the actuator arm. This design minimizes the overall ass movement of inertia for faster seek times. In these cases, the largest head slapping forces are typically associated with the top and bottom HGAs located adjacent to the base plate and the cover plate of the drive. There is also a relatively large amount of space between the plates and the top and bottom HGAs. The large spaces allow the heads to move away from the disk surfaces and then slap back onto the disks.

The force required to create a head slap can be increased by reducing the length of the flexure arm. However, reducing the length of the arm may create an undesirable change in other mechanical characteristics, such as larger actuator arm swing, for example, on the hard drive assembly. It would be desirable to provide a hard disk drive that limits the movement of an HGA within the disk drive. It would also be desirable to limit the movement of the HGA without increasing the overall height of the hard disk drive.

SUMMARY OF THE INVENTION

One embodiment of the present invention is a hard disk drive assembly which includes a limiter plate that is attached to an actuator arm. The limiter plate limits a movement of a flexure arm that is attached to a head. The head is coupled to a disk.

DETAILED DESCRIPTION

One embodiment of the present invention is a hard disk drive assembly which includes a limiter plate that is attached to an actuator arm. The limiter plate limits a movement of a flexure arm that is attached to a head. The head is coupled to a disk. The limiter plate limits the distance that the head can move away from the disk. Limiting the movement of the head may reduce the impact force associated with the head slapping the disk.

Figure 1:
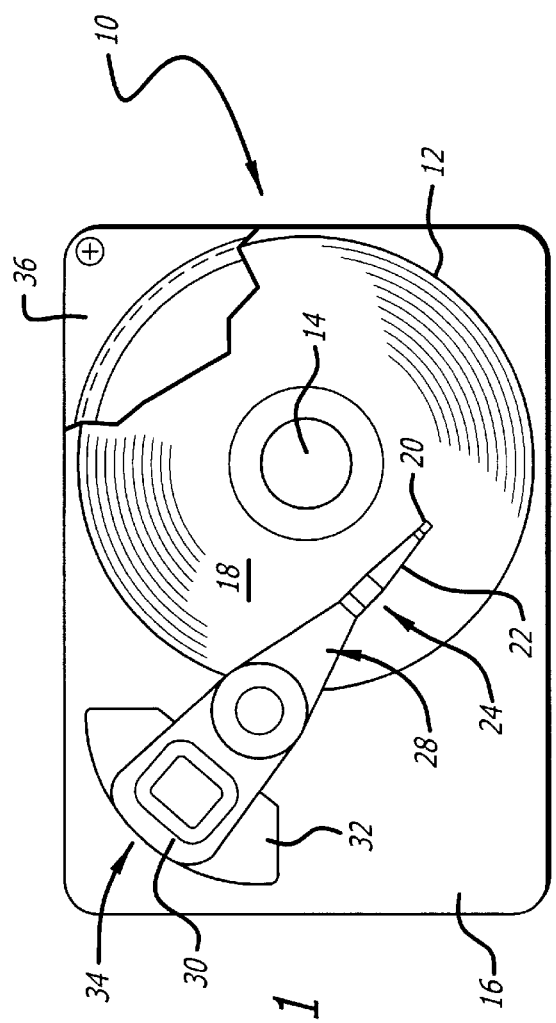
FIG. 1 is a top view of a hard disk drive assembly of the present invention.
Figure 2:
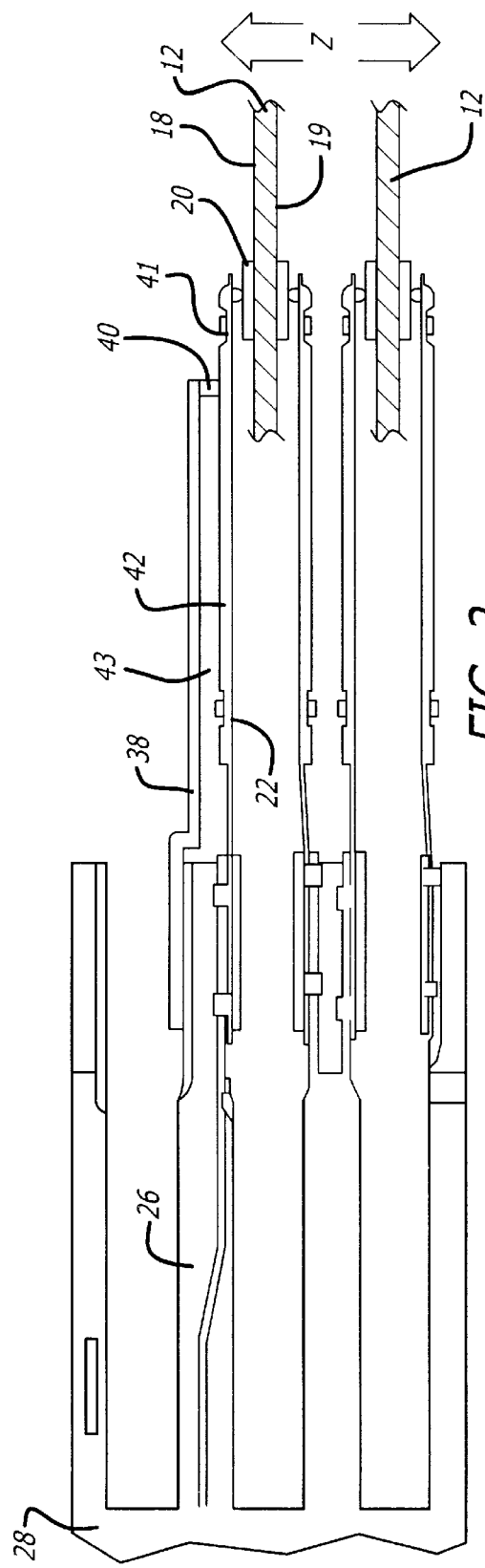
FIG. 2 is a side sectional view of the disk drive assembly.

Referring to the drawings more particularly by reference numbers, FIGS. 1 and 2 show an embodiment of a hard disk drive assembly 10 of the present invention. The disk drive assembly 10 may include one or more disks 12 that are rotated by a spin motor 14. The spin motor 14 may be mounted to a base plate 16. Each disk 12 has a top surface 18 and an opposite bottom surface 19.

A plurality of heads 20 may be magnetically coupled to the disks 12. The heads 20 may each contain at least one transducer (not shown) that is electrically connected to electronic circuitry (also not shown) of the disk drive. The circuitry and transducers can write and read information by magnetizing and sensing the magnetic field of the disks 12, respectively.

Each head 20 is typically mounted to a flexure arm 22. The head 20 and flexure arm 22 are commonly referred to as a head gimbal assembly (HGA) 24. There is typically an HGA 24 associated with each surface 18 and 19 of a disk 12. The HGAs 24 are mounted to beams 26 of an actuator arm 28 that is pivotally mounted to the base plate 16.

The actuator arm 28 may have a voice coil 30 that is coupled to a magnet assembly 32 which is attached to the base plate 16. The voice coil 30 and magnet assembly 32 provide a voice coil motor 34 which can be actuated to rotate the arm 28 and move the heads 20 across the surfaces of the disks 12. The disks 12, HGAs 24, actuator arm 28 and voice coil motor 34 are enclosed by a cover 36 that is attached to the base plate 16.

It is desirable to prevent movement of the heads 20 in a direction that is generally perpendicular to the disks 12, as indicated at "Z" and its associated arrows shown in FIG. 2. This perpendicular Z movement may be induced by external shock or vibration loads to the drive assembly 10. Z movement of the heads 20 away from the disk surfaces may result in a counter movement back into the disks. The impact force of the heads 20 striking the disk surfaces 18 and 19 may damage the heads 20 and probably damage the disks 12.

Figure 3:
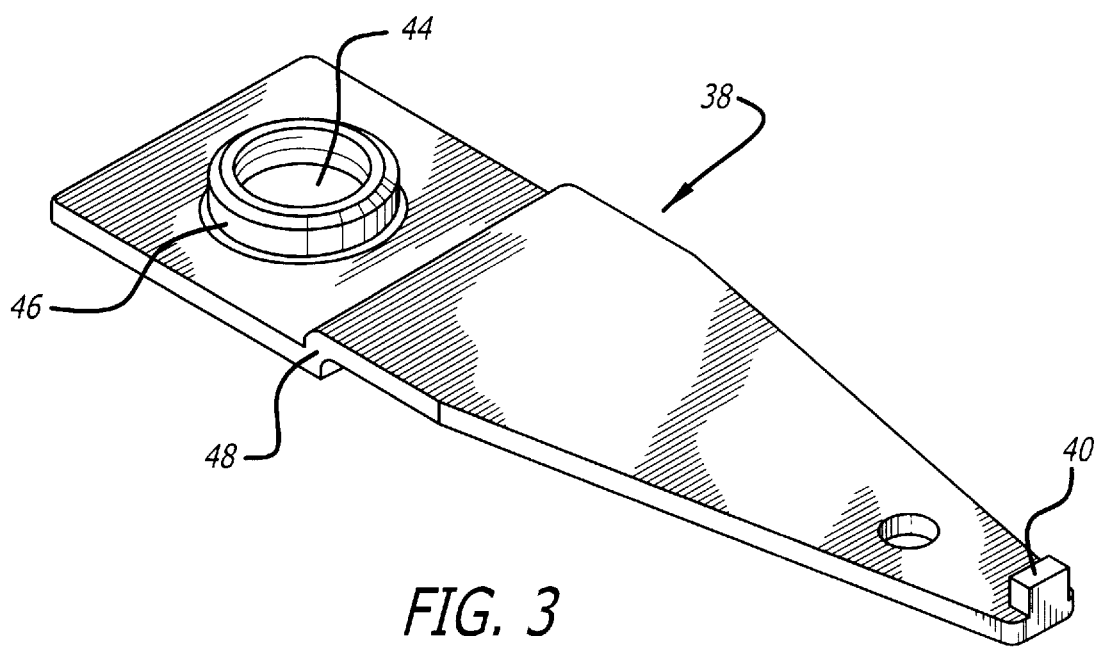
FIG. 3 is a perspective view of a limiter plate which limits a movement of a head within the disk drive.

The disk drive 10 of the present invention may have a limiter plate 38 which limits a Z movement of an adjacent flexure arm 22. Referring to FIGS. 2 and 3, the limiter plate 38 may include a tab 40 that projects toward a tip 41 of an adjacent flexure arm 22. The limiter plate tab 40 may have a width that is smaller than the corresponding width of the flexure arm 22, so that the tab 40 does not engage the rails 42 typically formed in the arm 22. The limiter plate tab 40 should have a length which leaves a space 43 between the tab 40 and the flexure arm 22 during normal operation of the drive. The space 43 should be sufficiently wide to accommodate manufacturing tolerances and insure that the tab 40 does not inadvertently press against the flexure arm 22 during the operation of the drive 10. The space 43 should also be sufficiently narrow to prevent undesirable Z movement of the head 20 away from the disk surface, 18, 19.

The limiter plate 38 may include an aperture 44 and a lip 46 which allow the plate 38 to be swaged onto one of the beams 26 of the actuator arm 28. The limiter plate 38 can be attached to one side of the beam 26 while the flexure arm 22 is swaged onto the other side of the beam 26.

The limiter plate 38 can be installed in lieu of an HGA. By way of example, the disk drive 10 may have two limiter plates 38 and four HGAs 24 installed into a hard disk drive which is originally designed to contain six HGAs 24. In this manner the plate 38 can be incorporated into the disk drive 10 without increasing the overall height of the drive 10.

The plate 38 may further have a step 48. The step 48 may allow the plate 38 to be installed in lieu of an HGA without changing the shipping and loading combs typically associated with the hard disk drive.

By limiting the Z movement of the flexure arm 22 and head 20 away from the disk surface, the limiter plate 38 limits the momentum and corresponding impact force of the head 20 slapping the disk 12. When the drive is subjected to a shock load, such as a shock load that is in the Z direction, for example, the corresponding forces will cause both the flexure arm 22 and the limiter plate 38 to move either up or down. The limiter plate 38 may be stiffer than the flexure arm 22 so that the plate 38 has relatively less flexure than the arm 22. Therefore, the limiter plate 38 of the present invention, particularly in an upward or downward direction, limits the movement of the arm 22 and the head 20 away from the disk 12. Thus, the invented limiter plate 38 limits the movement of the head 20 away from the surfaces 18, 19 of the disk 12 to inhibit damage to the head 20 and disk 12.

The limiter arm 38 may also have a mechanical transfer function that insures that the plate 38 does not move in phase with the flexure arm 22 during shock or vibrational loading. The mechanical transfer function also may limit the movement of the head 20 away from the disk 12.

Figure 4:
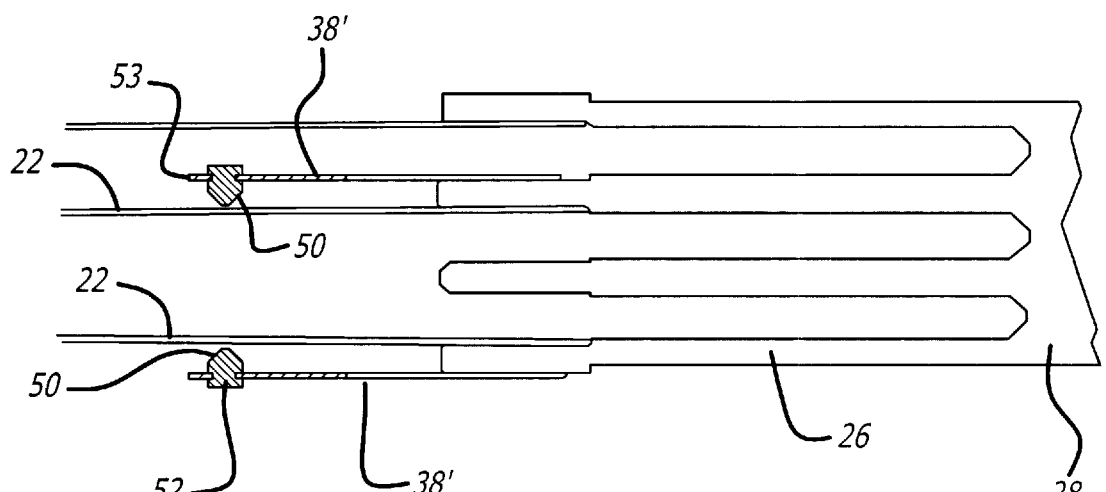
FIG. 4 is a side view of an alternate embodiment of the limiter plate within a hard disk drive.

FIG. 4 shows another embodiment of a limiter plate 38'. In the alternative embodiment, a bumper 50 is provided to dampen the force of the flexure arm 22 striking the plate 38' if the arm 22 strikes the plate 38' due to shock loads along the Z direction. The bumper 50 can be constructed from an elastomeric material such as rubber which is pressed into a corresponding aperture 52 firmed in distal end 53 of the limiter plate 38'.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive assembly, comprising:
   a disk that has a surface;
   a spin motor that rotates said disk;
   a head coupled to said surface of said disk;
   an actuator arm that has an e-block;
   a flexure arm that has a proximal end attached to said e-block of said actuator arm and a distal end attached to said head;
   a voice coil motor that is coupled to said actuator arm and moves said head across said surface of said disk; and,
   a limiter plate that is not attached to said flexure arm, said limiter plate has a proximal end attached to said e-block of said actuator arm and a distal end that is not in contact with said flexure arm during normal operation of the hard disk drive and which limits a movement of said flexure arm.

2. The hard disk drive of claim 1, wherein said limiter plate includes a tab that extends toward said flexure arm.

3. The hard disk drive of claim 1, wherein said limiter includes a bumper that extends toward said flexure arm.

4. The hard disk drive of claim 3, wherein said bumper is constructed from an elastomeric material.

5. The hard disk drive of claim 4, wherein said elastomeric bumper is pressed into said limiter plate.

6. The hard disk drive of claim 1, wherein said flexure arm and said limiter plate are swaged into said actuator arm.

7. The hard disk drive as recited in claim 1, wherein said limiter plate has a step.

8. A hard disk drive assembly, comprising:
   a disk that has a surface;
   a spin motor that rotates said disk;
   an actuator arm that has an e-block which has a plurality of beams, each beam having a first side and a second side;
   a flexure arm that is attached to said first side of said beam;
   a head that is mounted to said flexure arm and coupled to said disk;
   a voice coil motor that is coupled to said actuator arm and moves said head across said surface of said disk; and,
   a limiter plate that is attached to said second side of said actuator arm beam and is not in contact with said flexure arm during normal operation of the hard disk drive and which limits a movement of said flexure arm.

9. The hard disk drive of claim 8, wherein said limiter plate includes a tab that extends toward said flexure arm.

10. The hard disk drive of claim 9 wherein said tab is dimensioned to provide a space between said limiter plate and said flexure arm.

11. The hard disk drive of claim 10 wherein the space provided between said limiter plate and said flexure arm is sufficiently wide to accommodate manufacturing tolerances.

12. The hard disk drive of claim 10 wherein the space provided between said limiter plate and said flexure arm is sufficiently narrow to inhibit an undesirable movement of said flexure arm.

13. The hard disk drive of claim 12 wherein the space provided between said limiter plate and said flexure arm is sufficiently narrow to inhibit undesirable movement of said flexure arm away from said disk.

14. The hard disk drive of claim 8, wherein said limiter plate includes a bumper that extends toward said flexure arm.

15. The hard disk drive of claim 14 wherein said bumper is dimensioned to provide a space between said limiter plate and said flexure arm.

16. The hard disk drive of claim 15 wherein the space provided between said limiter plate and said flexure arm is sufficiently narrow to inhibit an undesirable movement of said flexure arm.

17. The hard disk drive of claim 10, wherein said bumper is constructed from an elastomeric material.

18. The hard disk drive of claim 17, wherein said elastomeric bumper is pressed into said limiter plate.

19. The hard disk drive of claim 8, wherein said flexure arm and said limiter plate are swaged into said actuator arm beam.

20. The hard disk drive as recited in claim 8, wherein said limiter plate has a step.

* * * * *